United States Patent [19]
Enomoto et al.

[11] Patent Number: 5,305,361
[45] Date of Patent: Apr. 19, 1994

[54] METHOD OF AND APPARATUS FOR WATER-JET PEENING

[75] Inventors: Kunio Enomoto, Ibaraki; Masahiro Otaka, Hitachi; Koichi Kurosawa, Hitachi; Hideyo Saito, Hitachi; Hiroshi Tsujimura, Hitachi; Yasumasa Tamai, Hitachi; Keiichi Uraki, Hitachi; Masahito Mochizuki, Hitachi, all of Japan

[73] Assignee: Hitachi, Ltd., Tokyo, Japan

[21] Appl. No.: 8,718

[22] Filed: Jan. 25, 1993

[30] Foreign Application Priority Data

Jan. 24, 1992 [JP] Japan .................................. 4-010856

[51] Int. Cl.$^5$ .............................................. G21C 19/00
[52] U.S. Cl. .................................... 376/316; 376/305; 134/1; 134/34; 239/102.2
[58] Field of Search ............... 376/316, 310, 305, 277, 376/249; 239/4, 102.2; 134/1, 34, 22.12, 167 R; 299/17

[56] References Cited

U.S. PATENT DOCUMENTS

| | | |
|---|---|---|
| 4,326,553 | 4/1982 | Hall .......................................... 134/1 |
| 4,389,071 | 6/1983 | Johnson, Jr. et al. ................... 134/1 |
| 4,436,694 | 3/1984 | Vassalotti et al. ................... 376/310 |
| 4,470,952 | 9/1984 | Vassalotti ............................. 376/316 |
| 4,496,519 | 1/1985 | McGuire ............................... 376/316 |
| 4,497,664 | 2/1985 | Verry ................................. 134/22.12 |
| 5,154,347 | 10/1992 | Vijay ................................. 239/102.2 |
| 5,186,389 | 2/1993 | Shibano ............................. 239/102.2 |

FOREIGN PATENT DOCUMENTS

| | | |
|---|---|---|
| 59-193215 | 11/1984 | Japan . |
| 62-63614 | 3/1987 | Japan . |
| 2-222760 | 9/1990 | Japan . |
| 3-161271 | 7/1991 | Japan . |

*Primary Examiner*—Daniel D. Wasil
*Attorney, Agent, or Firm*—Antonelli, Terry, Stout & Kraus

[57] ABSTRACT

A water jet peening method in which a pressurized water jet flow containing cavities is jetted through a nozzle having a velocity increasing orifice portion and a horn-like jetting hole formed continuously with the velocity increasing orifice portion to impinge against a surface of a metallic material immersed in water and to cause the cavities to collapse at the surface of the metallic member, and a tensile plastic deformation is caused in a surface layer of the metallic material by a local high pressure generated by the impingement and the collapse so that a residual tensile stress in the surface of the metallic member is reduced. In this method, the nozzle is vibrated so that vibration-induced cavities are formed in the vicinity of a nozzle wall surface, and the vibration-induced cavities are caused to impinge against the surface of the metallic member by the pressurized water jet flow containing cavities. It is thereby possible to promote the generation of cavities even in a case where pure water existing in a nuclear reactor and scant of nuclei from which cavities will be generated is used in peening of an internal structual member of the reactor.

12 Claims, 5 Drawing Sheets

METHOD OF AND APPARATUS FOR WATER-JET PEENING

BACKGROUND OF THE INVENTION

1. Field of the Invention

This invention relates to a water-jet peening method for reducing a residual tensile stress existing in a surface of ordinary metallic materials or a surface layer of parts of internal nuclear reactor equipment and an apparatus for practicing the method and, more particularly, to a water-jet peening method and an apparatus suitable for forming a residual compressive stress in a surface layer by impinging a high-velocity jet flow of the water containing cavities aginst the surface of materials in the water, thereby improving the stressed state thereof.

2. Description of the Prior Art

It is generally known that if a member formed of a metal such as an austenite stainless steel is placed in high-temperature water such as that in a nuclear reactor, intergranular stress corrosion cracking (hereinafter referred to as an abbreviation "IGSCC") occurs in the member in the vicinity of a welded portion thereof. IGSCC is considered to be caused under a condition that three factors, i.e., sensitization of the material, a tensile stress and a corrosive environment, are superposed. Sensitization of a material occurs in such a manner that a Cr carbide precipitates at grain boundaries to form a Cr-depletion layer in the extreme vicinity of the grain boundaries by welding heat or the like so that Cr-depletion zone in the vicinity of the grain boundaries become sensitive to corrosion. A tensile stress is caused by superposition of a residual tensile stress caused by welding or working on a stress caused by an external force. Corrosion is caused by high temperature water containing dissolved oxygen. IGSCC can be prevented by removing one of these three factors.

Japanese Patent Unexamined Publication No. 62-63614 discloses a conventional method as a means for improving a residual stress characteristic. In this method, a high pressure water jetting device having a rotating nozzle capable of jetting a high-pressure liquid jet is inserted into a pipe of a heat exchanger or the like, which is to be improved in a residual stress characteristic, and the high pressure liquid is thereby jetted and impinged upon an inner surface layer of the pipe to cause a plastic deformation in the inner surface layer by dynamic-pressure energy of the impingement of the jet (axial dynamic pressure energy of a jet flow), whereby a residual tensile stress existing originally in the pipe is reduced.

As another residual stress improving means, a surface strengthening method disclosed in Japanese Patent Unexamined Publication No. 59-193215 is known. In this method, an impingement force caused by pressure-collapse of cavities generated in a liquid is applied to a surface portion of a metallic member immersed in the liquid. Cavities are generated by causing ultrasonic vibration of a horn immersed in the liquid as one means thereof, or by jetting a high-pressure high-velocity liquid flow into the liquid as another means thereof.

The conventional process disclosed in Japanese Patent Unexamined Publication No. 62-63614 is effective as a method of improving a residual stress of a pipe inner surface of a heat exchanger or the like. However, this method, in which a liquid flow jetted from a nozzle in atmospheric air is impringed on a surface of a metallic member to peen this surface by impinging energy of the flow, is a method which utilizes impringing dynamic pressure energy of a water jet in atmospheric air and depends upon the water jet output alone. In a case where this method is applied to peening in water, the velocity of a jet flow is considerably reduced before the jet flow reaches a metal surface and it is difficult to achieve the desired peening effect, because the water jet meets a resistance of surrounding water and because the water jet is diffused in the surrounding water. To obtain the same dynamic pressure as that of a jet flow in atmospheric air, water jetting at a super high pressure is required. Thus, the use of this method in such a condition is disadvantageous in terms of performance of a pump and other related components and working cost.

The method disclosed in Japanese Patent Unexamined Publication No. 59-193215, which generates cavities by ultrasonic vibration jetting or high-pressure high-velocity jetting, entails the same problem in the case of high-pressure high-velocity jetting. Ultrasonic vibration jetting is effective in generating cavities, but it is necessary to generate cavities in certain proximity to a predetermined surface portion to be processed, and the effect is therefore restricted by the setting of a horn for generating ultrasonic vibration.

SUMMARY OF THE INVENTION

In view of these problems of the prior art, an object of the present invention is to provide a water jet peening method and a water jet peening apparatus for improving a residual stress of a surface portion of metallic member by utlizing a super high pressure which is produced when cavities in a high-velocity water flow jetted to the metallic member surface collapse instead of utilizing impinging dynamic pressure energy of a jet water flow, more particularly, a method and an apparatus suitably applied to peening of nuclear reactor equipment members or the like.

To achieve this object, according to the present invention, there is provided a water jet peening method including a step in which a high-velocity water jet flow containing cavities is jetted through a nozzle having a velocity increasing orifice portion and a horn-like jetting hole formed continuously with the velocity increasing orifice portion to impinge against a surface of a metallic material immersed in water and to cause the cavities to collapse at the surface of the metallic member, and in which a tensile plastic deformation is caused in a surface layer of the metallic material by a local high pressure generated by the impingement and the collapse so that a residual tensile stress in the surface of the metallic member is reduced. This method comprises a step of vibrating the nozzle by applying high-frequency vibration to the nozzle so that vibration-induced cavities are formed in the vicinity of a nozzle wall surface, and a step of causing the vibration-induced cavities to impinge against the surface of the metallic member by the high-velocity water jet flow containing cavities.

In accordance with the present invention, the nozzle is vibrated in water by high-frequency vibration to form vibration-induced cavities in the vicinity of a nozzle wall surface, and a high-velocity water jet flow containing cavities is caused to impinge against the metallic member surface. The density of cavities contained in the water jet flow is thereby increased to increase the residual stress improving effect.

In a case where the present invention is applied to peening of a nuclear reactor member or the like, a peening arm to which a peening gun is attached in an apparatus for practicing the above-described method may have a flexing mechanism. The present invention can be thereby applied easily to peening of a structure similar to a cave having a narrow opening. That is, the peening gun is passed through an inlet by being retracted like an umbrella, and is thereafter opened inside the structure to perform peening of an internal surface of the cavity. By using this function, the present invention can be applied to internal structural members of a nuclear reactor, in particular, a reactor core.

In the above-described apparatus, a guide roller may be provided on the peening gun to constantly maintain the distance between the metallic material surface and the nozzle as well as to prevent a deviation of the peening gun from the correct position. The peening positioning accuracy is thereby improved, so that the high pressure jet can be performed. A CCD camera may also be provided on the nozzle to enable a needed portion to be confirmed with the eye. By cooperation of these effects, a residual stress characteristic and the reliability of peening can be improved.

DESCRIPTION OF THE PREFERRED EMBODIMENTS

An embodiment of the present invention will be described below with reference to FIGS. 1 to 5.

Figure 2:
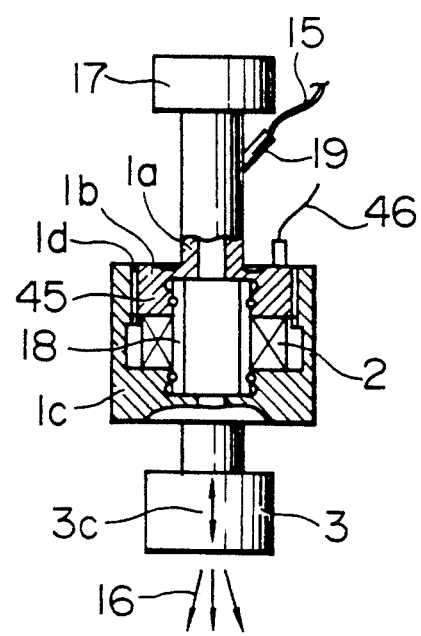
FIG. 2 is a partial sectional front view of a peening gun of the water jet peening apparatus shown in FIG. 1.
Figure 3:
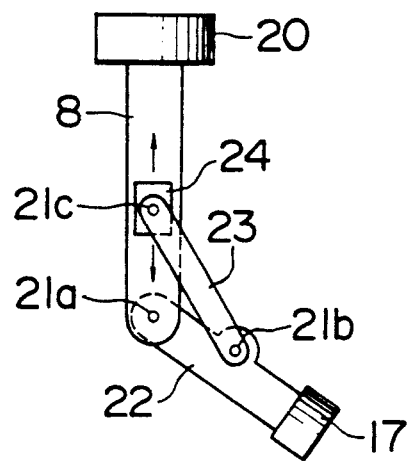
FIG. 3 is a detailed illustration of a flexing arm of the water jet peening apparatus shown in FIG. 1.

A peening gun 1 is mounted by being attached to a lower end of a mast 7 through a flexing arm 8. The mast 7 is perpendicularly suspended from a horizontal arm 6 which is supported by a three-axis driving unit 5 on a stand 4 standing on a base 9. The peening gun 1 has a gun body 1a, a vibrator supporting portion 1b and a nozzle supporting portion 1c, which are successively connected to each other, as shown in FIG. 2. A communication path for supplying a high pressure fluid, i.e., water to be jetted through a nozzle 3 described later is formed in the peening gun 1. A vibrator 2, e.g., a piezoelectric element or the like, is set between the vibrator supporting portion 1b and the nozzle supporting portion 1c and is fixed to these portions, for example, by bonding, screw-fastening 1d or the like. The vibrator 2 causes minute-amplitude high-frequency longitudinal vibrations 3c in the nozzle 3 by a signal supplied through a driving cable 46. A sleeve 18 is provided in the vibrator 2. Opposite ends of the sleeve 18 are watertightly supported through packings 45 on the supporting portions 1b and 1c. The nozzle 3 is supported on the nozzle supporting portion 1c. The nozzle 3 has a flow velocity increasing orifice portion and a horn-like jetting hole formed continuously with the orifice portion. The construction of the nozzle 3 is not illustrated in detail but it is the same as nozzles of the kind already disclosed in some publications.

The thus-constructed peening gun 1 is attached to the lower end of the mast 7 and is placed in a water tank 12 filled with water. A mount base 13 on which a metallic material or a metallic specimen 10 to be peened by water jet peening is mounted is provided in the water tank 12. In order to enable the peening gun 1 to freely move relative to the metalic member or specimen 10, a three-axis driving unit 5 conventionally used is provided. The driving unit 5 is arranged to vertically move and rotate the horizontal arm 6 freely relative to the stand 4, i.e., to enable both driving (Z-direction) along a vertical axis, rotational driving (Y-direction) on the longitudinal axial line of the stand 4 and horizontal moving (X-direction) in the driving unit 5. The three-axis (X,Z,Y) driving unit 5 enables the peening gun 1 to move three-dimensionally in each of directions along X-, Y- (a normal direction to a surface of the paper), and Z-axes.

A carriage 6a is mounted on the horizontal arm 6 supported on the three-axis driving unit 5 so as to be able to horizontally travel along the same. The mast 7 is perpendicularly suspended from the carriage 6a. The carriage 6a may be the same three-axis driving unit as that monted on the stand 4.

A high-pressure water flow supplied to the peening gun 1 is obtained as water ejected in a pressurized state from a high pressure pump 14 which draws water in the water tank 12 through a bottom portion of the tank 12 and a hose 27. This water is led through a high pressure hose 15, the mast 7 and a hose coupler 19. The operation of the high pressure pump 14 and the pressure of the output therefrom are controlled through a water jet control panel 28.

The waveform, the frequency and the amplitude of vibration caused in the vibrator 2 are controlled through a vibrator control panel 29 having a high-frequency generator, a frequency controller, an amplitude amplifier and other components.

Figure 1:
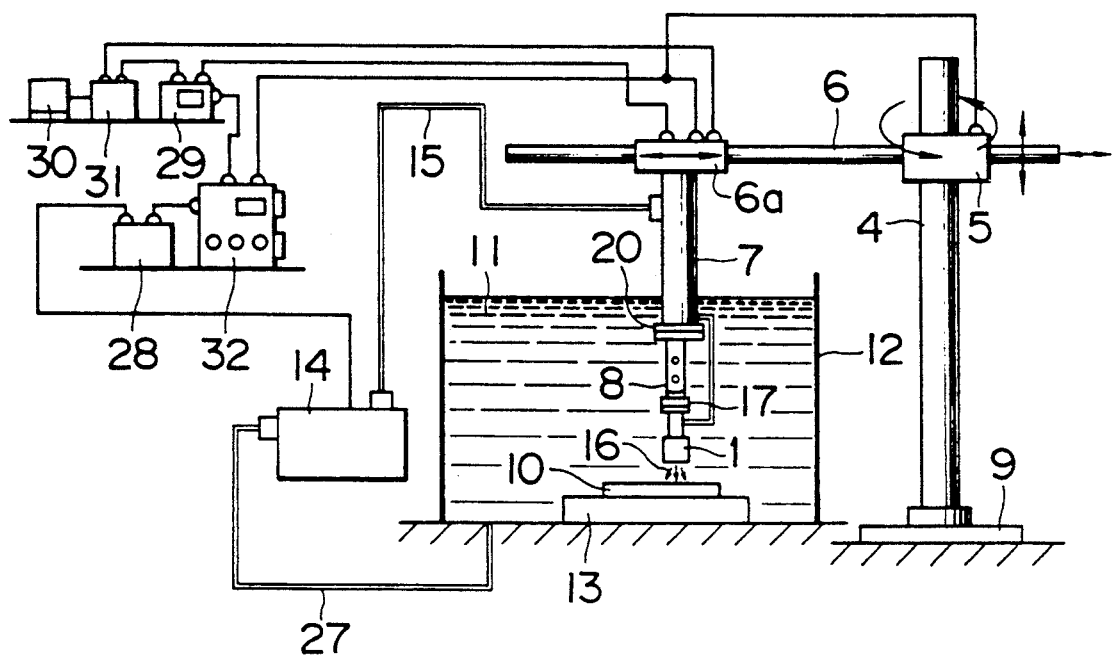
FIG. 1 is a schematic front view of a water jet peening apparatus in accordance with an embodiment of the present invention.

FIG. 1 shows the flexing arm 8 connecting the peening gun 1 to the mast 7. The flexing arm 8 has an arm coupler 20 through which it is connected to the lower end of the mast 7. The flexing arm 8 has a gun holder 22 (FIG. 3) pivotally attached to its lower end portion by a pin 21a. The peening gun 1 is attached to the gun holder 22 through a coupler 17. The flexing arm 8 has a structure which is not illustrated in detail but in which the gun holder 22 is linked to a slider 24 disposed so as to be slidable on the flexing arm 8 by a link 23 which is pivotally attached to the slider 24 and to a central portion of the gun holder 22 by pins 21b and 21c. The flexing arm 8 is provided with an unillustrated air or hydraulic cylinder which serves to slide the slider 24 in a vertical direction as indicated by arrows in FIG. 3. It is thereby possible for the gun holder 22 to move in an opening/closing manner like an umbrella to move the peening gun 1 in accordance with the vertical movement of the slider 24. The illustration of FIG. 2 corresponds to downward working a metallic member laid horizontally. However, lateral working on a metallic member positioned upright can be performed by moving the slider 24 upward so that the gun holder 22 faces in a horizontal direction.

Figure 4:
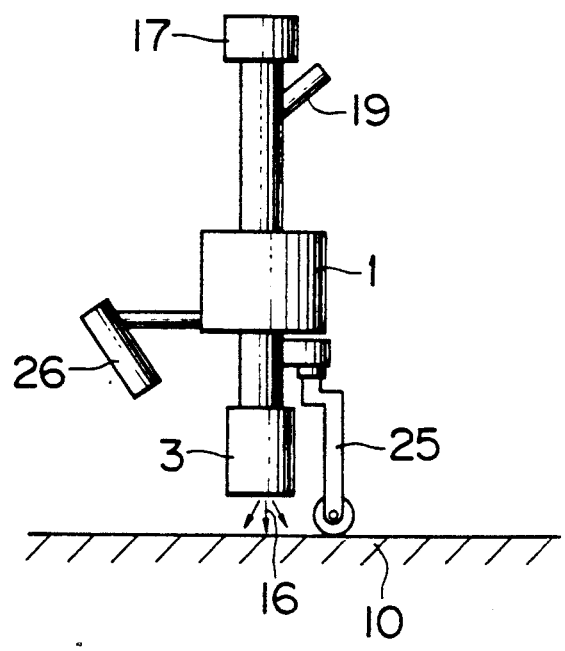
FIG. 4 is a front view of another embodiment of the peening gun.

FIG. 4 shows another embodiment of the peening gun 1 constructed in such a manner that a universal guide roller 25 and a CCD camera 26 are mounted on the peening gun 1 shown in FIG. 2. The guide roller 25 is attached to the body of the peening gun 1 in a suitable position such that the nozzle 3 and a surface of a metallic member 10 are maintained at an optimal distance from each other. The CCD cameral 26 is attached to the peening gun body through a supporting member which spaces the camera 26 from the peening gun body and positions the camera so that the state of a water jet colliding against a portion to be worked can be confirmed with the eye. Image information from CCD camera 26 is displayed on a video display 30 and is recorded by a recorder 31 along with information on working instruction conditions and working results.

If the peening gun shown in FIG. 4 is used, an optimal distance can be maintained between the nozzle 3 and the metallic member surface and can be confirmed, whereby the working reliability can be improved.

In the above-described arrangement, the metallic member 10 is set on the mount base 13, the peening gun 1 is set in a worked position, and water 11 is thereafter drawn from the water tank 12 through the hose 27 by the high pressure pump 14. High pressure water thereby pressurized and led through the high pressure hoss 15 is jetted as a water jet flow through the peening gun 1. The operation and the pressure of the high pressure pump 14 are controlled through the water jet control panel 28.

Thereafter, the vibrator 2 of the peening gun 1 is suitably vibrated. To do so, the waveform, the frequency and the amplitude of the vibration of the vibrator 2 are controlled through a vibrator control panel 29 having a high-frequency generator, a frequency controller, an amplitude amplifier and other components. In this state, the apparatus is ready to start water jet peening in accordance with the present invention. Then, the three-axis driving unit 5 is driven in a predetermined direction at a designated speed by using a general controller 32 to scan the peening gun 1, thereby continuously performing water jet peening.

Figure 5:
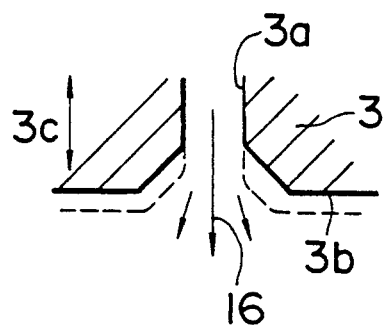
FIG. 5 is a diagram for explaining the generation of cavities in the method and the apparatus in accordance with the present invention.

The generation of cavities in the nozzle 3 of the above-described apparatus will be described below with reference to the longitudinal sectional view of FIG. 5.

High-frequency vibration in a longitudinal direction 3c is applied to the nozzle 3 while the waveform, the frequency and the amplitude are controlled so that cavities are formed at a wall surface 3a of a flow path and a wall surface 3b of an end portion of the nozzle 3. In this state, high pressure water flows through the nozzle 3. In this case, the longitudinal direction 3c is the same as the direction in which the high pressure water flows through the nozzle 3. When the nozzle 3 is vibrated by receiving the high-frequency vibration, cavities or cavity nuclei are formed by shearing with water at the inner wall surface 3a and by separation from water at the wall surface 3b perpendicular to the direction of the vibration. The amount of cavities or cavity nuclei at the wall surface 3b is larger than that at the wall surface 3a. A jet water flow 16 is jetted to the metallic member while involving cavities generated by the water jet flow 16 alone and cavities or cavity nuclei generated at the wall surfaces. The amount of involved cavities generated by this water jetting is greater in comparison with a case of separately using water jet flow 16. Therefore, the stress improving effect attained in a certain period of time can be increased. Also, direct contact of the vibrator 2 and the water flow can be avoided by the effect of the circular sleeve 18, so that a damage to the vibrator 2 can be prevented.

An image of the state of peening is obtained by the CCD camera 26 to be displayed on the video display 30 and to be recorded by the recorder 31. The water jet control panel 28, the vibrator control panel 29, the video display 30 and the recorder 31 and other components are not singly controlled but controlled by the general control panel 32 in a system control manner. The working reliability can be thereby improved. There is no need for a pre-treatment and a post-treatment even if there is an oxidation layer previously formed in the surface of a member to be worked by the process in accordance with the present invention.

Figure 6:
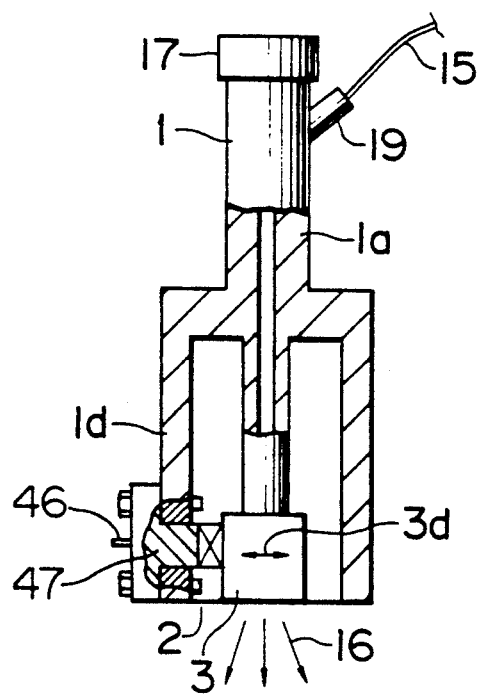
FIG. 6 is a partial sectional front view of a further embodiment of the peening gun for use in the apparatus of the present invention.

FIG. 6 shows another example of the peening gun 1 used in the water jet peening method of the present invention. This peening gun 1 differs from that shown in FIG. 2 in that the vibrator 2 is arranged through the vibrator holder 47 to apply high-frequency vibration to the nozzle 3 of the peening gun 1 in a lateral direction 3d. Therefore, the nozzle surface perpendicular to the direction 3d of vibration is wider in comparison with the arrangement shown in FIG. 2. Accordingly, cavities generated by high-frequency vibration are increased and the stress improving effect is also increased in comparison with the arrangement shown in FIG. 2. Further, in this case, the need for the cylindrical sleeve 18 necessary in the arrangement shown in FIG. 2 is eliminated. The structure of the peening gun 1 can therefore be simplified. The vibrator 2 can be supported in such a manner as to be surrounded by a supporting portion 1d, and can be thereby protected.

Figure 7:
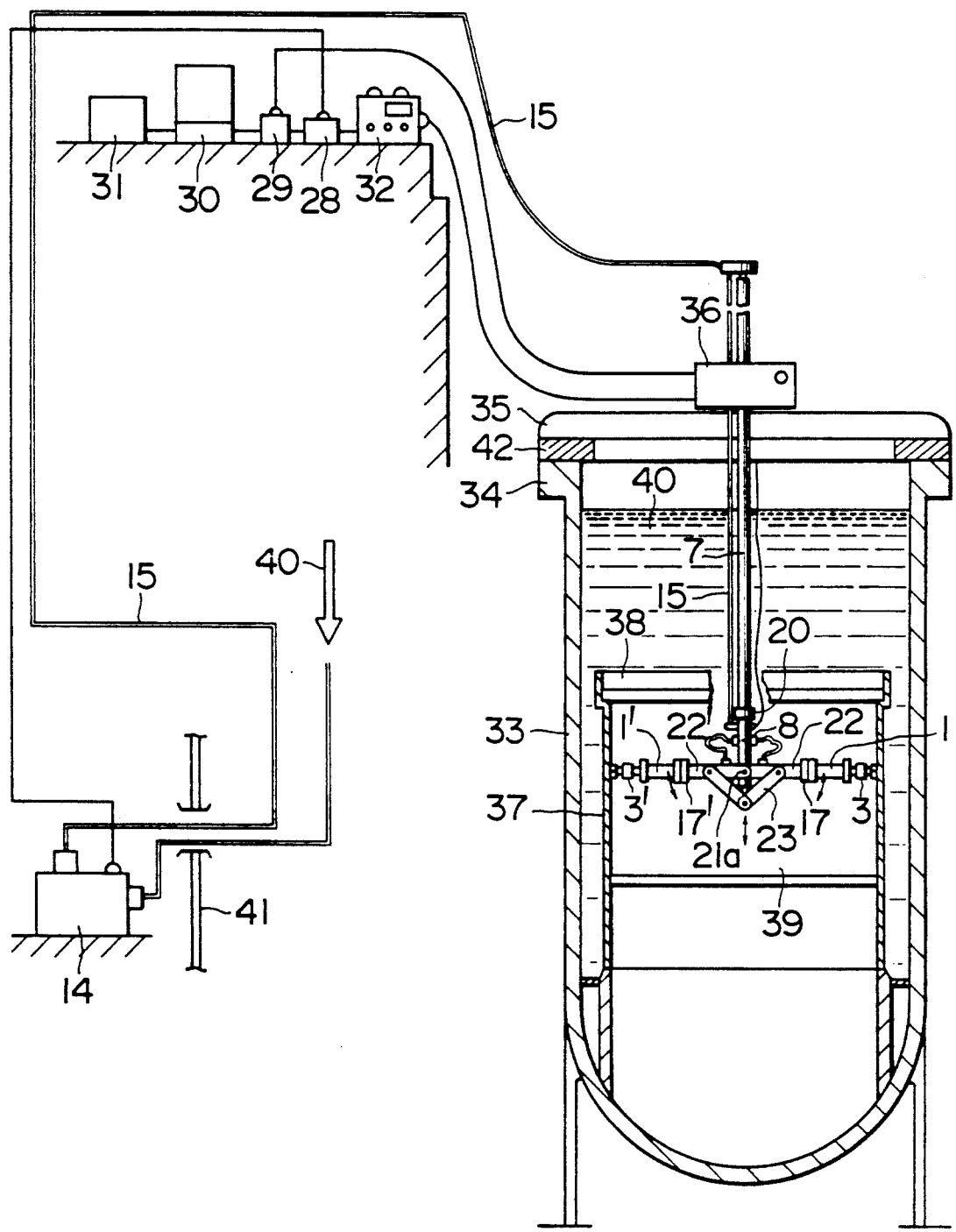
FIG. 7 is a diagram of an example of an application of the water jet peening apparatus of the present invention.

FIG. 7 shows an example of an application of the present inventin to a nuclear power plant. Units of reactor core equipment and a shroud 37 of a boiling water reactor type nuclear power plant are illustrated in FIG. 7.

First, a structure and function of the equipment according to this embodiment will be briefly described as follows. This equipment comprises a peening gun 1, a mast 7, a flexing arm provided with a gun holder 22, a high pressure pump 14, a high pressure hose 15, a water jet peening control panel 28, a vibrator control panel 29, a video display 30, a recorder 31 and a general controller 32 as well as the embodiment of FIG. 1, and further a swivel carriage 35, a moving carriage 36 and a base 42.

The base 42 is disposed on a flange surface of a pressure vessel 33 and, as briefly explained, has a annular rail for swivelling the swivel carriage 35 on an upper surface thereof and a hole having a diameter corresponding to an inner diameter of the pressure vessel 33 so that the mast 7 suspended in a central portion thereof can be moved in a radial direction thereof.

The swivel carriage 35 is set on an annular rack of the base 42 so as to be able to swivel coaxially with the pressure vessel 33. The swivel carriage 35 is also provided with an automatic driver so as to freely rotate on the annular rack. The rack is laid radially on an upper surface of the swivel carriage 35.

The moving carriage 36 is provided with a mast driving apparatus for vertically moving a self-propelled means and the mast 7 and is mounted on the rack of the swivel carriage 35 so as to be self-propelled radially on the rack.

The mast 7 has a rack for vertically moving itself and is engaged with the moving carriage 36 so as to vertically move. The mast 7 also serves as a guide of the high pressure hose 15 and has the flexing arm 8 provided with the peening gun 1 on the lowest end of the mast 7.

The peening gun 1 can be moved in peripheral and axial directions of an inner wall surface of the shroud 37 by locating the moving carriage 36 at a central position of the pressure vessel 33, vertically moving the mast 7 and swivelling the swivel carriage 35. Further, the moving carriage 36 can be positioned deflective from a center of the pressure vessel 33, and the peening gun 1 can be made to effect unsymmetrical movement, so that these can be applied to internal structural members of the reactor such as an upper lattice place except for the shroud 37.

Although swivelling of the base 42 and the swivel carriage 35, radial self-propelling of the swivel carriage 35 and the moving carriage 36 and vertically moving of the moving carriage 36 and mast 7 are described in the example of combining a rack with a pinion, these may be performed by other means.

Next, the method of setting peening guns 1, 1' of this embodiment will be described below. In a case of peening the shroud 37 of the reactor, an upper cover of a pressure vessel 33 is removed, a steam drier, a steam separator, a fuel channel assembly in the reactor are successively dismounted, and control rods and neutron flux measuring tubes are extracted out of a lower section of the pressure vessel 33, while a rector core portion 39 is filled with core water alone. Thereafter, a base 42 is placed on an upper surface of a flange 34 of the pressure vessel 33, and a swivel carriage capable of rotating on the center axis of the pressure vessel 33 is mounted on the base 42 and a moving carriage 36 capable of moving in radial directions are mounted on an upper surface of the swivel carriage 35, although details of these carriages are not illustrated. A mast 7 formed of a plurality of sections and extendible in the vertical direction is suspended from the moving carriage 36. A flexing arm assembly 8 having a plurality of gun holders 22, 22' (two in opposite positions in this embodiment) and peening guns 1, 1' are attached to a lowermost end of the mast 7 through an arm coupler 20. The position of the moving carriage 36 is determined by moving the swivel carriage 35 and the moving carriage 36 so that the mast 7 can pass through a central hole in an upper lattice plate 38 generally coinciding with the center of the shroud 37. The end of the mast 7 is moved downward through the central lattice hole of the upper lattice plate 38 while the flexing arm assembly 8 is maintained in a straightened state, that is, a main portion 8a of the arm assembly 8 and the gun holders 22, 22' are generally aligned with each other. When the flexing arm assembly 8 reaches the core portion 39, the arms of the flexing arm assembly 8 are flexed so that the peening guns 1, 1' face an inner wall surface of the shroud 37.

After the peening guns 1, 1' have been positioned in this manner, core water 40 led to a high pressure pump 14 placed on the outside of a container 41 by a water jet control panel 28 and a general controller 32 is supplied to the peening guns 1, 1' through a high pressure hose 15 while being pressurized and is jetted through nozzles 3, 3'. After or before the jetting, the vibrators 2 of the peening guns 1, 1' are energized by a vibrator control panel 29 and the general controller 32 to apply high-frequency vibration to the nozzles 3, 3', thereby starting water jet peening.

The mast 7 is rotated for peening in the circumferential direction of the shroud 37, and the mast 7 is extended/rotated in the axial direction of the shroud 37. The shroud 37 is thereby scanned with the nozzles 3, 3' to continuously perform peening in these directions. Thus, the peening guns 1, 1' are moved three-dimensionally. It is thereby possible to peen welded portions in each of the circumferential and axial directions of the shroud 37 by water jet peening. As a result, a residual tensile stress caused by welding or the like can be reduced and IGSCC can be prevented. Since core water 40 is used, there is no need to recover the jetted water and no waste matter is newly generated. If the core water cannot be used as water to be fed to the high pressure pump, pure water separately prepared may be used. Even if pure water having less cavity nuclei is used, cavities can be sufficiently generated to improve a residual stress characteristic, since the peening guns 1, 1' are vibrated by the vibrators while they are capable of jetting high pressure water.

In this embodiment, the peening guns 1, 1' each corresponding to that shown in FIG. 2 or 6 are used. However, in a case where peening guns 1, 1' having rollers as shown in FIG. 4 are used, there arms of the flexing arm assembly 8 are flexed so that the rollers are pressed against the inner wall surface of the shroud 37 by a slight pressing force. The distance between the nozzles 3, 3' and the surface to be worked can be thereby maintained constantly and the nozzles 3, 3' can be moved stably. Thereafter, the nozzles 3, 3' are correctly positioned with respect to initial worked portions. Since a CCD camera is provided, the state of the flexing arm assembly 8 being moved downward through the central lattice hole of the upper lattice plate 38 and the positioned state of the nozzles 3, 3' can be confirmed with the eye. It is thereby possible to perform working with improved reliability.

Figure 8:
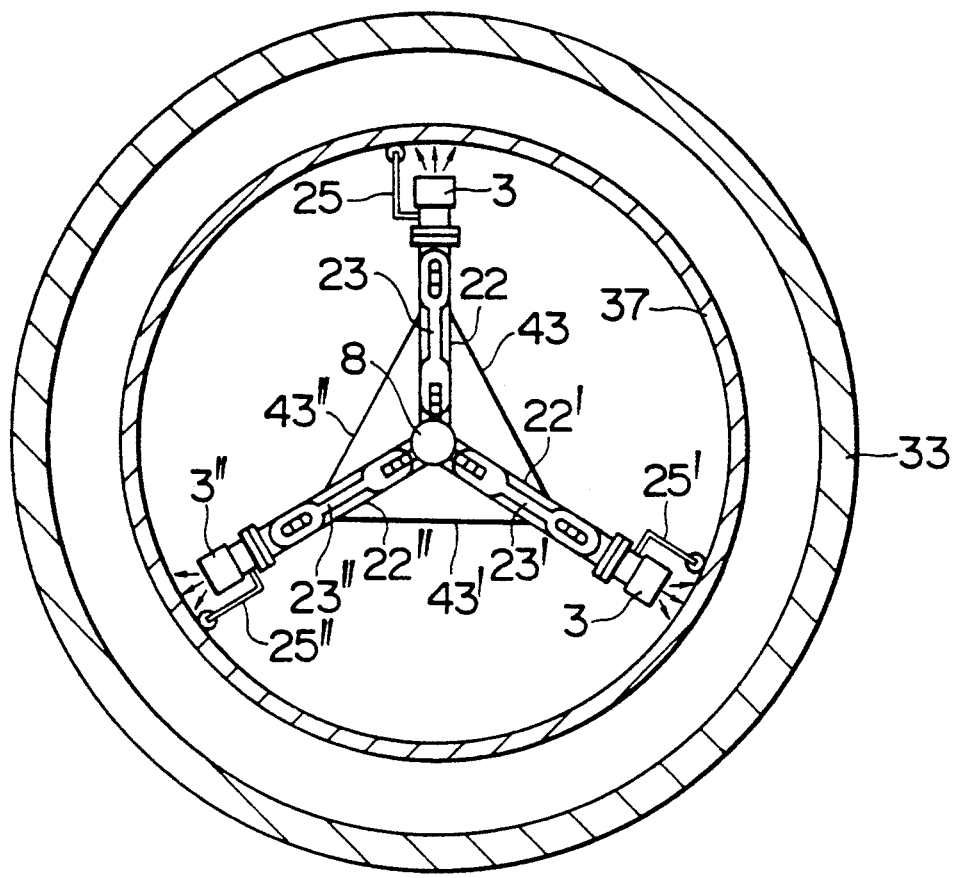
FIG. 8 is a diagram of the placement of flexing arms used in the water jet peening apparatus shown in FIG. 7.

In FIG. 8, a situation where a flexing arm assembly 8 having gun holders 22, 22', 22" on which three nozzles 3, 3', 3" are set is set on an inner surface of a shroud 37 is illustrated as viewed in a position above the reactive core. The nozzles 3, 3', 3" are equally spaced apart from each other by 180° in the circumferential direction. The gun holders 22, 22', 22" are connected to each other by the members 43, so that the stability of the positioned state of the gun holders is improved.

Figure 9:
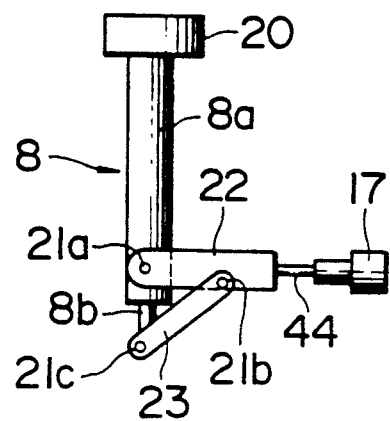
FIG. 9 is a front view of each flexing arm used in the water jet peening apparatus shown in FIG. 7.

In this case, it is not always necessary to flex the arms of the flexing arm assembly so that the arms face the inner surface of the shroud 37 perpendicularly, and the arms may be positioned so as to extend slantingly upwardly or slantingly downwardly with respect to portions to be worked. The position of the nozzles can therefore be selected easily to peen upper and lower corners of the shroud or portions to which additional members are welded. In such a case, a flexing arm 8 having a gun holder 22 with an extendible extension member 44 such as that shown in FIG. 9 may be used to adjust the distance between each nozzle 3 and a surface to be worked.

In the above-described embodiment, the present invention is applied to peening of a shroud. However, it is also possible to work a lattice plate lower surface or a reactor core support plate by inserting the mast 7 through any of lattice holes of the upper lattice plate. Further, it is possible to work an upper surface portion of the lattice plate by extracting the mast 7 from the lattice hole.

In the above-described arrangement, cavities or cavity nuclei generated by ultrasonic vibration are added to cavities generated by a water jet alone, so that the density of cavities in the water jet is increased. The stress characteristic can be correspondingly improved from a tensile state toward a compressed state in comparison with the conventional method.

If the vibrator is arranged on each nozzle so as to apply longitudinal vibration to the nozzle, cavities or cavity nuclei can be generated easily. Also, if the vibrator is arranged on each nozzle so as to apply lateral vibration to the nozzle, it is easier to generate cavities or cavity nuclei.

The control of the three-dimensional positioning and the scanning speed of each peening nozzle, the control of the pressure and the flow rate of the water jet, and the control of the frequency and the amplitude of the ultrasonic nozzle vibration are performed in a linked relationship with each other, thereby enabling a sequential control. Water jet peening is also possible without any ultrasonic vibration.

Since a flexible peening arm to which a peening gun is attached and which is capable of flexing at its intermediate portion through any angle is used, it is possible to perform water jet peening at any angle without changing the peening gun.

If the above-described water jet peening apparatus is applied to peening of internal structural memers of a nuclear reactor, water jet peening can be effected on installed internal structural memers or core structural members of the reactor pressure vessel without adding an additive to core water in which the amount of cavity nuclei from which cavities are generated. Each peening gun can be set at any angle such as to be perpendicular or oblique to a worked member. The range of application is therefore wide.

A plurality of peening arms constructed as described above are arranged on the mast so as to extend radially and so as to be equally spaced apart from each other, whereby a plurality of portions can be worked simultaneously and the working efficiency is improved. Also, the distance between the peening nozzles and the surface to be worked can be constantly maintained, and the jetting reation to the nozzles can be balanced in a self balancing manner, thereby reducing the load on the mast.

Further, a plurality of peening arms each having a peening gun with a guide roller and capable of opening and closing like an umbrella is attached to the lowermost end of the mast through a coupler. The distance between the peening nozzles and the surface to be worked can be thereby maintained constantly, so that the residual stress improving effect can be stably maintained.

As described above, the present invention is effective in improving installed internal structural members of a reactor pressure vessel in residual stress characteristic and can therefore prevent stress corrosion cracking in such members. Since core water is used as an operating fluid, no waste matter is newly generated. Moreover, working can be performed by a remote control, so that the dose of radiation to human operators can be reduced.

What is claimed is:

1. A water jet peening method including the steps of:
forming a water jet flow of a predetermined velocity containing cavities through a nozzle having a velocity increasing orifice portion and a horn-like jetting hole formed continuously with said velocity increasing orifice portion;
vibrating said nozzle by applying a vibration to said nozzle so that vibration induced cavities are formed in a vicinity of a nozzle wall surface;
impinging said water jet flow against a surface of a metallic material immersed in water;
causing said vibration-induced cavities to impinge against the surface of said metallic member by said pressurized water jet flow containing cavities; and
causing said cavities to collapse at the surface of said metallic member wherein there is caused a tensile plastic deformation in a surface layer of said metallic material by a local cavity collapsing pressure so that a residual tensile stress in the surface of said metallic member is reduced.

2. A water jet peening method according to claim 1, wherein said nozzle is vibrated in one of a direction along the water jet flow and a direction perpendicular to the water jet flow.

3. A water jet peening apparatus for peening a metallic material placed on a mount base in a water tank by water jetting, said apparatus comprising:
pressurized fluid generation means for generating a pressurized fluid;
pressurized fluid supply means for supplying said pressurized fluid to a nozzle;
said nozzle connected to said pressurized fluid generating means and said pressurized fluid supply means, said nozzle for providing said pressurized fluid as a water jet;
a peening gun having a vibrator for vibrating said nozzle;
a three dimensional traveling means for making said peening gun travel three-dimensionally;
high-pressure fluid control means for controlling a pressure and a flow rate of said pressurized fluid;
vibrator control means for generating a frequency signal for operating said vibrator and for controlling a frequency, waveform and amplitude of said vibrator; and
peening gun control means for three-dimensionally controlling said peening gun to control a distance, direction and velocity of said nozzle with respect to said metallic material.

4. A water jet peening apparatus according to claim 3, wherein said nozzle is attached to said peening gun through one of a vibrator for causing longitudinal vibration and a vibrator for causing lateral vibration, said nozzle having a velocity increasing orifice portion and a horn-like jetting hole formed continuously with said velocity increasing orifice portion, said nozzle for use in water.

5. A water jet peening apparatus comprising:
a pressure pump for generating a pressurized fluid;
a pressurized hose for supplying said pressurized fluid to a nozzle;
a water jet control panel for controlling said pressure pump and a pressure and flow rate of said pressurized fluid;
a vibrator control panel having a frequency- and waveform-variable frequency oscillator and an amplifier, for controlling a frequency, waveform and amplitude of a vibrator;

a peening arm having at one end a coupler for engagement with a vibrating mechanism and being engaged at said one end with said pressurized hose, and having at another end a peening gun having said nozzle;

a three-axis drive table for making said peening arm travel three-dimensionally;

a water tank having a mount table on which a metallic member is mounted; and a general controller for controlling a distance between said nozzle and a surface of said metallic member, and a direction and velocity of three-dimensional traveling of said nozzle.

6. A water jet peening apparatus according to claim 5, wherein said nozzle is attached to said peening gun through one of a vibrator for causing longitudinal vibration and a vibrator for causing lateral vibration, said nozzle having a velocity increasing orifice portion and a horn-like jetting hole formed continuously with said velocity increasing orifice portion, said nozzle for use in water.

7. A water jet peening apparatus according to claim 5, wherein said peening arm comprises a flexing peening arm having a joint such as to be able to flex through a selected angle at an intermediate position on a pressurized flexible hose engagement portion, and said apparatus further comprises a peening control panel having a function of controlling a flexing angle of said peening arm and angular velocity of said flexing angle.

8. A water jet peening apparatus for peening an internal structural member of a nuclear reactor, comprising:

a swivel carriage placed on an upper surface of a flange of a pressure vessel of said nuclear reactor having a core evacuated by removing an upper cover of said pressure vessel and by successively dismounting a steam drier, a steam separator and fuel channels, said swivel carriage being radially movable on said pressure vessel;

a radially-movable carriage mounted on an upper surface of said swivel carriage, said radially-movable carriage being radially movable on said pressure vessel;

a mast suspended from said radially-movable carriage, formed of a plurality of sections and extendible in a vertical direction; and a flexible peening arm attached to a lowermost section of said mast through a coupler;

wherein a pressurized water jet flow of reactor core water ejected from a pressurized vibration nozzle of said peening arm is jetted to a surface of said internal structural member to reduce residual tensile stress therein.

9. A water jet peening apparatus according to claim 8, wherein each peening arm of a plurality of said peening arms is provided with a peening gun having a guide roller, said peening guns being attached to a lowermost end of said mast through a coupler so as to be able to open and close like an umbrella.

10. A water jet peening apparatus according to claim 8, wherein said nozzle is attached to said peening gun through one of a vibrator for causing longitudinal vibration and a vibrator for causing lateral vibration, said nozzle having a velocity increasing orifice portion and a horn-like jetting hole formed continuously with said velocity increasing orifice portion, said nozzle for use in water.

11. A water jet peening method of using tensile plastic deformation to reduce residual tensile stress in a surface layer of a metal, said method including the steps of:

forming a pressurized water jet flow through a nozzle having a velocity increasing orifice portion and a horn-like jetting hole formed continuously with said velocity increasing orifice portion, and impinging said water jet flow against a surface of a metallic material immersed in water;

vibrating said nozzle by applying frequency vibration to said nozzle so that vibration-induced cavities are formed in a vicinity of a nozzle wall surface; and directing said vibration-induced cavities ti impinge against said surface of said metallic member by said pressurized water jet flow containing cavities, and causing the cavities to collapse at the surface of said metallic member to induce a tensile plastic deformation in a surface layer of said metallic material by a local cavity collapsing pressure generated so that a residual tensile stress in a surface of said metallic member is reduced.

12. A water jet peening method according to claim 1, wherein said nozzle is vibrated in one of a direction along a water jet flow and a direction perpendicular to said water jet flow.

* * * * *